US007603213B2

(12) United States Patent
Iida

(10) Patent No.: US 7,603,213 B2
(45) Date of Patent: Oct. 13, 2009

(54) IN-VEHICLE DEVICE FOR DETECTING DRIVING CONDITION AND COMPUTER PROGRAM PRODUCT FOR USE IN THE SAME

(75) Inventor: Masahiro Iida, Kariya (JP)

(73) Assignee: DENSO CORPORATION, Kariya (JP)

( * ) Notice: Subject to any disclaimer, the term of this patent is extended or adjusted under 35 U.S.C. 154(b) by 108 days.

(21) Appl. No.: 11/500,305

(22) Filed: Aug. 8, 2006

(65) Prior Publication Data

US 2007/0118257 A1 May 24, 2007

(30) Foreign Application Priority Data

Nov. 18, 2005 (JP) ............................ 2005-334220

(51) Int. Cl.
*G01M 17/00* (2006.01)
*G06F 7/00* (2006.01)
*G06F 19/00* (2006.01)

(52) U.S. Cl. ............................ 701/29; 701/31; 701/33; 701/35; 701/38; 73/570

(58) Field of Classification Search ....................... None
See application file for complete search history.

(56) References Cited

U.S. PATENT DOCUMENTS 4,933,888 A * 6/1990 Bloyet et al. .................. 702/86
5,383,123 A * 1/1995 Kunz ........................... 701/37
5,978,743 A * 11/1999 Kiyono ......................... 702/86
6,498,996 B1 * 12/2002 Vallot ......................... 702/104
7,167,785 B2 * 1/2007 Lohberg et al. ............... 701/34
2004/0002638 A1 * 1/2004 Yanagidaira et al. ........ 600/300
2006/0184297 A1 * 8/2006 Higgins-Luthman ......... 701/41
2007/0006659 A1 * 1/2007 Schwartzbart et al. ........ 73/649

FOREIGN PATENT DOCUMENTS

JP A-4-315962 11/1992
JP A-8-110225 4/1996
JP A-2004-20207 1/2004

* cited by examiner

*Primary Examiner*—Khoi Tran
*Assistant Examiner*—Nicholas Kiswanto
(74) *Attorney, Agent, or Firm*—Posz Law Group, PLC

(57) ABSTRACT

An in-vehicle device for detecting a driving condition includes: first and second sensors for detecting one of acceleration and angular speed; first and second determination units for determining whether a detection signal from each sensor is varied with a frequency equal to or larger than a predetermined determination frequency and with a variation amount larger than a predetermined variation threshold; and a vibration noise removal unit for determining that a vibration noise is superimposed on each detection signal. The vibration noise removal unit removes the vibration noise from each detection signal.

10 Claims, 7 Drawing Sheets

IN-VEHICLE DEVICE FOR DETECTING DRIVING CONDITION AND COMPUTER PROGRAM PRODUCT FOR USE IN THE SAME

CROSS REFERENCE TO RELATED APPLICATION

This application is based on Japanese Patent Application No. 2005-334220 filed on Nov. 18, 2005, the disclosure of which is incorporated herein by reference.

FIELD OF THE INVENTION

The present invention relates to an in-vehicle device for detecting a driving condition and a computer program product for use in the same.

BACKGROUND OF THE INVENTION

A navigation device for an automotive vehicle includes an angular speed sensor, an acceleration sensor and the like. The angular speed sensor detects angular speed of the vehicle around an axis perpendicular to a horizontal plane, on which the vehicle is disposed. The acceleration sensor detects acceleration of the vehicle in a front-back direction of the vehicle.

The navigation device is usually mounted on an instrument panel of the vehicle. When the device is tilted to the vehicle, a detection axis of the angular speed sensor or the acceleration sensor accommodated in the device is also tilted to a regular axis. Thus, the angular speed or the acceleration is not detected correctly.

In view of the above problem, a tilt angle of the sensor is detected even when the sensor is tilted to the regular axis, so that the angular speed or the acceleration is compensated by the detected tilt angle. Thus, driving conditions of the vehicle such as a driving direction and a slanting angle of the vehicle are compensated on the basis of detection signals from the angular speed sensor, the acceleration sensor and the like.

Specifically, for example, the acceleration sensor detects the acceleration in the front-back direction of the vehicle, so that the slanting angle of the vehicle (i.e., a pitch angle) in the front-back direction of the vehicle is detected on the basis of the detection signal from the acceleration sensor. In the navigation device including this acceleration sensor, change of the vehicle direction obtained on the basis of the detection signal from the angular speed sensor is compared with change of the vehicle direction obtained from change of vehicle position detected by a GPS receiver. A tilting angle of the navigation device to the vehicle in the front-back direction is calculated from a difference between the change obtained from the sensor and the change obtained from the GPS receiver. The pitch angle detected on the basis of the detection signal from the acceleration sensor is compensated on the basis of the calculated tilting angle. This compensation is disclosed in, for example, JP-A-2004-020207.

In the above technique, if the detection signal from the acceleration sensor or the angular speed sensor does not include noise, the pitch angle can detect correctly. This is because the pitch angle obtained from the detection signal of the acceleration sensor is compensated by the slanting angle of the navigation device obtained from the detection signal of the angular speed sensor.

However, in the above technique, it is assumed that the angular speed sensor and the acceleration sensor are tilted from an ideal detection axis. Therefore, the detection signal from the angular speed sensor includes an angular speed component around an axis perpendicular to a horizontal plane of the vehicle and a vibration component in a vertical direction of the vehicle. Further, the detection signal from the acceleration sensor includes an acceleration component in a front-back direction of the vehicle and a vibration component in the vertical direction of the vehicle. Thus, since each detection signal includes the vibration component, detection accuracies of the acceleration and the angular speed are reduced so that detection accuracies of a driving direction of the vehicle and a pitch angle are also reduced. Specifically, the detection signal from the acceleration sensor is correct when the actual detection axis of the acceleration sensor is parallel to the driving direction of the vehicle. The detection signal from the angular speed sensor is correct when the actual detection axis of the angular speed sensor is perpendicular to the horizontal plane of the vehicle. Therefore, since the navigation device is mounted to tilt from an ideal axis of the vehicle so that the actual detection axis of each sensor is tilted from the ideal axis, for example, a vibration noise caused by an up-down bounce of the vehicle is superimposed on the detection signal from each sensor when the vehicle rides over a step so that the vehicle bounces up and down. Accordingly, the detection accuracies of the acceleration and the turning angle are reduced.

The detection signals from the acceleration sensor and the angular speed sensor are filtered so that excess high frequency noise is removed. The filtering process is performed for example by a moving average method. The vibration noise having a low frequency such as a few Hz or lower cannot be removed by the above filtering process.

Further, when a low pass filter having a low cut off frequency for removing the vibration noise is introduced, the acceleration and the angular speed are not detected.

The above problem exists not only in the navigation device having the angular speed sensor and the acceleration sensor but also in another in-vehicle device having the angular speed sensor and/or the acceleration sensor. Here, the other in-vehicle device is, for example, a sensor for detecting a driving condition of the vehicle in order to control an engine of the vehicle, to control an attitude of the vehicle or to control a cruise of the vehicle.

SUMMARY OF THE INVENTION

In view of the above-described problem, it is an object of the present disclosure to provide an in-vehicle device for detecting a driving condition. It is another object of the present disclosure to provide a computer program product for use in an in-vehicle device for detecting a driving condition.

According to a first aspect of the present disclosure, an in-vehicle device for detecting a driving condition of an automotive vehicle includes: a first sensor for detecting one of acceleration of the vehicle and angular speed of the vehicle, wherein the angular speed is defined around a predetermined axis of the vehicle; a second sensor for detecting one of the acceleration of the vehicle and the angular speed of the vehicle; a first determination unit for determining whether a first detection signal from the first sensor is varied with a first frequency equal to or larger than a predetermined first determination frequency and with a first variation amount larger than a predetermined first variation threshold; a second determination unit for determining whether a second detection signal from the second sensor is varied with a second frequency equal to or larger than a predetermined second determination frequency and with a second variation amount larger than a predetermined second variation threshold; and a vibration noise removal unit for determining that a vibration noise caused by vertical vibration of the vehicle is superimposed on each detection signal of the first and second sensors when both of the first and second determination units determine that each detection signal is varied with the frequency equal to or larger than the determination frequency and with the variation amount larger than the variation threshold. The vibration noise removal unit removes the vibration noise from each detection signal when the vibration noise removal unit determines that the vibration noise is superimposed on each detection signal, and the vibration noise is defined by the determination frequency and the variation threshold.

In the above device, when both detection signals from two sensors, which are affected by up/down vibration of the vehicle, are varied at the same time, i.e., synchronously, the vibration noise is removed from each detection signal. Thus, only when the vehicle rides over a step or the like so that the vehicle vibrates in the vertical direction, the vibration noise is removed from each detection signal. Accordingly, detection accuracies of the acceleration and the angular speed of the vehicle are improved.

According to a second aspect of the present disclosure, an in-vehicle device for detecting a driving condition of an automotive vehicle includes: a sensor for detecting one of acceleration of the vehicle and angular speed of the vehicle, wherein the angular speed is defined around a predetermined axis of the vehicle; an image capture unit for capturing an image around the vehicle; a determination unit for determining whether a detection signal from the sensor is varied with a frequency equal to or larger than a predetermined determination frequency and with a variation amount larger than a predetermined variation threshold; a vehicle vibration determination unit for determining whether the vehicle vibrates with a vehicle vibration frequency and with a vehicle vibration amount on the basis of a change of the image from the image capture unit, wherein vibration of the vehicle with the vehicle vibration frequency and the vehicle vibration amount affects the detection signal from the sensor; and a vibration noise removal unit for determining that a vibration noise caused by vertical vibration of the vehicle is superimposed on the detection signal when the determination unit determines that the detection signal is varied with the frequency equal to or larger than the determination frequency and with the variation amount larger than the variation threshold and when the vehicle vibration determination unit determines that the vibration of the vehicle affects the detection signal from the sensor. The vibration noise removal unit removes the vibration noise from the detection signal when the vibration noise removal unit determines that the vibration noise is superimposed on each detection signal, and the vibration noise is defined by the determination frequency and the variation threshold.

In this case, the vibration noise removal unit can detect much accurately that the vibration noise is superimposed on the detection signal. Thus, if the vehicle does not vibrate in the vertical direction, the vibration noise removal unit does not determine by mistake that the vibration noise is superimposed on the detection signal.

According to a third aspect of the present disclosure, a computer program product in a computer readable medium for use in an in-vehicle device for detecting a driving condition of an automotive vehicle, the product includes: an instruction for detecting one of acceleration of the vehicle and angular speed of the vehicle with a first sensor, wherein the angular speed is defined around a predetermined axis of the vehicle; an instruction for detecting one of the acceleration of the vehicle and the angular speed of the vehicle with a second sensor; an instruction for determining with a first determination unit whether a first detection signal from the first sensor is varied with a first frequency equal to or larger than a predetermined first determination frequency and with a first variation amount larger than a predetermined first variation threshold; an instruction for determining with a second determination unit whether a second detection signal from the second sensor is varied with a second frequency equal to or larger than a predetermined second determination frequency and with a second variation amount larger than a predetermined second variation threshold; and an instruction for determining with a vibration noise removal unit that a vibration noise caused by vertical vibration of the vehicle is superimposed on each detection signal when both of the first and second determination units determine that each detection signal is varied with the frequency equal to or larger than the determination frequency and with the variation amount larger than the variation threshold. The vibration noise removal unit removes the vibration noise from each detection signal when the vibration noise removal unit determines that the vibration noise is superimposed on each detection signal, and the vibration noise is defined by the determination frequency and the variation threshold.

In the above product, when both detection signals from two sensors, which are affected by up/down vibration of the vehicle, are varied at the same time, i.e., synchronously, the vibration noise is removed from each detection signal. Thus, only when the vehicle rides over a step or the like so that the vehicle vibrates in the vertical direction, the vibration noise is removed from each detection signal. Accordingly, detection accuracies of the acceleration and the angular speed of the vehicle are improved.

According to a third aspect of the present disclosure, a computer program product in a computer readable medium for use in an in-vehicle device for detecting a driving condition of an automotive vehicle, the product includes: an instruction for detecting one of acceleration of the vehicle and angular speed of the vehicle with a sensor, wherein the angular speed is defined around a predetermined axis of the vehicle; an instruction for capturing an image around the vehicle with an image capture unit; an instruction for determining with a determination unit whether a detection signal from the sensor is varied with a frequency equal to or larger than a predetermined determination frequency and with a variation amount larger than a predetermined variation threshold; an instruction for determining with a vehicle vibration determination unit whether the vehicle vibrates with a vehicle vibration frequency and with a vehicle vibration amount on the basis of a change of the image from the image capture unit, wherein vibration of the vehicle with the vehicle vibration frequency and the vehicle vibration amount affects the detection signal from the sensor; and an instruction for determining with a vibration noise removal unit that a vibration noise caused by vertical vibration of the vehicle is superimposed on the detection signal when the determination unit determines that the detection signal is varied with the frequency equal to or larger than the determination frequency and with the variation amount larger than the variation threshold and when the vehicle vibration determination unit determines that the vibration of the vehicle affects the detection signal from the sensor. The vibration noise removal unit removes the vibration noise from the detection signal when the vibration noise removal unit determines that the vibration noise is superimposed on each detection signal, and the vibration noise is defined by the determination frequency and the variation threshold.

In this case, the vibration noise removal unit can detect much accurately that the vibration noise is superimposed on the detection signal. Thus, if the vehicle does not vibrate in the vertical direction, the vibration noise removal unit does not determine by mistake that the vibration noise is superimposed on the detection signal.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
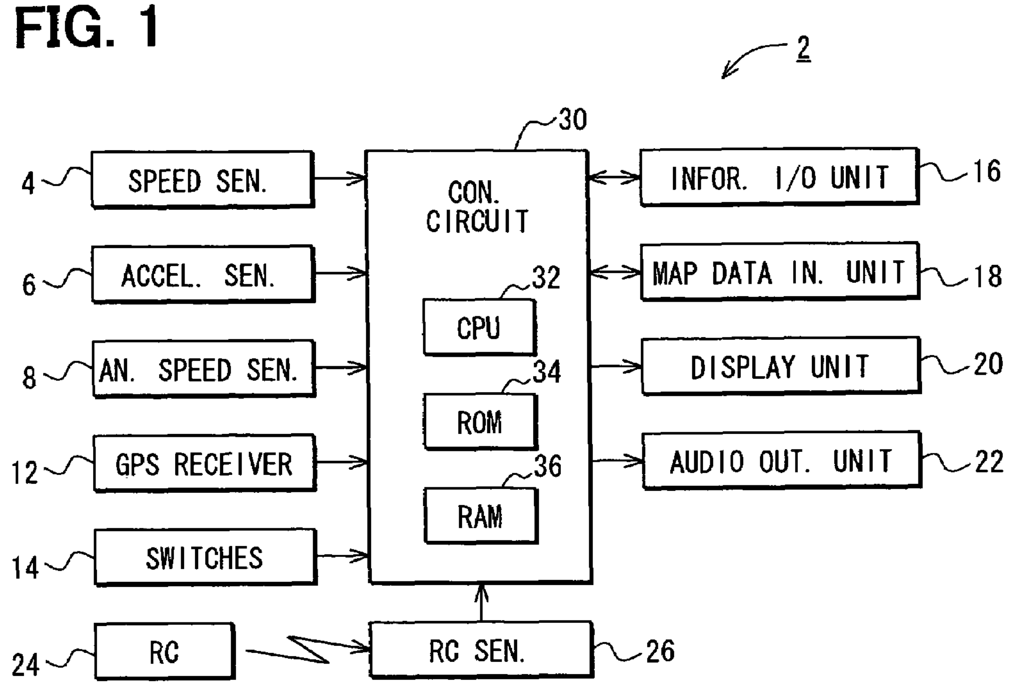
FIG. 1 is a block diagram showing a navigation device.

A navigation device 2 is shown in FIG. 1. The device 2 includes independent sensors such as a vehicle speed sensor 4, an acceleration sensor 6 and an angular speed sensor 8, a GPS receiver 12, operation switches 14, an information input/output unit 16, a map data input unit 18, a display unit 20, an audio output unit 22, a remote control 24, a remote control sensor 26 and a control circuit 30. The vehicle speed sensor 4 detects a speed of an automotive vehicle and outputs a detection signal corresponding to the speed. The acceleration sensor 6 detects acceleration applied to the vehicle in a front-back direction and outputs a detection signal corresponding to the acceleration. The angular speed sensor 8 detects angular speed around an axis perpendicular to a horizontal plane of the vehicle when the vehicle turns and outputs a detection signal corresponding to the angular speed. The GPS receiver 12 receives a transmission electric wave from an artificial satellite of GPS so that a current position, a speed, a driving direction and the like of the vehicle are calculated. An operator, for example, a driver or a passenger in the vehicle operates the operation switches 14 for instructing various orders. The information input/output unit 16 communicates with an external device to input and output information therebetween. The map data input unit 18 reads out a map data or the like from memory medium. The display unit 20 displays the map, a screen for guiding a route and the like. The audio output unit 22 outputs a voice guide. The operator operates the remote control, i.e., RC, 24 remotely. The remote control sensor 26 receives an instruction signal from the RC 24 and inputs the signal to the control circuit 30. The control circuit 30 is connected to sensors 4, 6, 8, the GPS receiver 12, switches 14, the external information input/output unit 16, the map data input unit 18, the display unit 20, the audio output unit 22 and the RC sensor 26 so that the control circuit 30 executes various processes for guiding.

The operation switches 14 are composed of touch panel switches on the display unit 20, mechanical switches disposed around the display unit 20 and the like.

The information input/output unit 16 communicates with the external device such as a beacon embedded in a traffic road so that traffic information outputted from an external information center is obtained. Further, the information input/output unit 16 communicates with various in-vehicle devices mounted on the vehicle so that various information regarding driving conditions of the vehicle is obtained. The information input/output device 16 is composed of multiple communication devices.

The map data input unit 18 reads out a data for map matching and a voice data for guiding the route from the memory medium such as a CD-ROM, a DVD-ROM and a hard disk. The data for map matching is used for improving position detection accuracy. Further, the map data input unit 18 inputs the data into the control circuit 30.

The display unit 20 is composed of a liquid crystal display or the like. The display unit 20 may include a color display. The control circuit 30 controls the display so that the display unit 20 displays a map around the current position of the vehicle and a driving route from the current position to an object point, which is inputted by the operator.

The audio output unit 22 includes a speaker and the like. The control circuit 30 controls the audio output unit 22 so that the audio output unit 22 outputs a guide voice for guiding the route to the object point and a guide voice for guiding the traffic information, which is obtained from the external information device through the information input/output unit 16.

The control circuit 30 is provided by a microcomputer, which includes a CPU 32, a ROM 34, a RAM 36 and a bus line. The bus line connects among the CPU 32, the ROM 34 and the RAM 36.

The CPU 32 detects the driving condition of the vehicle such as the current position of the vehicle, the vehicle speed, the driving direction and a tilt angle of the vehicle on the basis of various detection signals inputted from individual sensors (i.e., the speed sensor 4, the acceleration sensor 6 and the angular speed sensor 8) and measurement result of the GPS receiver 12. The CPU 32 executes the above detection along with a program memorized in the ROM 34. Thus, the CPU 32 executes calculation process for calculating the driving condition and a driving trajectory.

The CPU 32 reads out the map data from the memory medium through the map data input unit 18. The map data includes the current position of the vehicle. On the basis of the read map data, the CPU 32 executes a map display process for displaying the road map including the current position of the vehicle and the driving trajectory on the display unit 20. Further, the CPU 32 executes to calculate the driving route to the object point in accordance with an instruction inputted from the RC sensor 26 and/or the switches 14. Furthermore, the CPU 32 executes a route guide process for displaying the guide route on the display unit 20 in accordance with the calculation result of the route and/or for outputting the guide voice for guiding the route from the audio output unit 22.

When one of the detection signals from the sensors 4, 6, 8 is inputted into the CPU 32 so that the CPU 32 detects the driving condition of the vehicle, the CPU 32 executes a filtering process for removing high frequency noise for the detection signal. Before the filtering process, the CPU 32 executes a vibration noise removing process for removing vibration noise from the detection signals inputted from the acceleration sensor 6 and the angular speed sensor 8. The vibration noise is superimposed on the detection signal when the vehicle bounces up and down.

Figure 2:
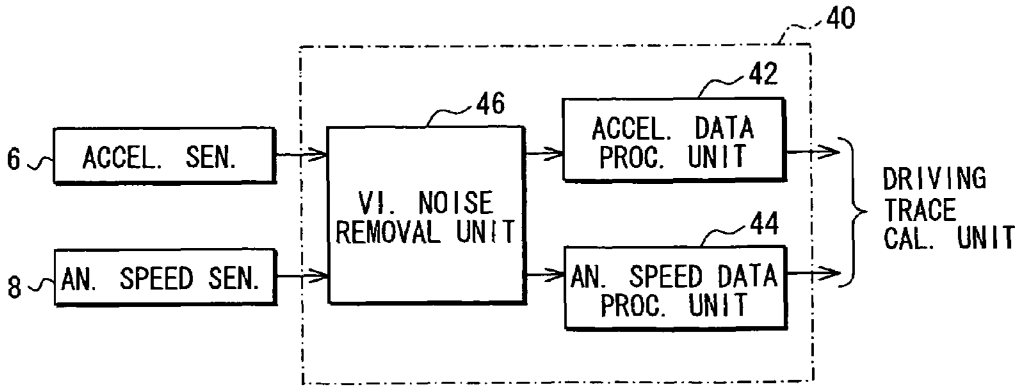
FIG. 2 is a block diagram showing a sensor signal processing unit in the navigation device.

In the control circuit 30, as shown in FIG. 2, the control circuit 30 includes a sensor signal processing unit 40 for processing the detection signals from the acceleration sensor 6 and the angular speed sensor 8. The sensor signal processing unit 40 includes a vibration noise removal unit 46, an acceleration data processing unit 42 and an angular speed data processing unit 44. The acceleration data processing unit 42 executes the above filtering process so that an acceleration data obtained from the detection signal of the acceleration sensor 6 is filtered. The angular speed data processing unit 44 executes the above filtering process so that an angular speed date obtained from the detection signal of the angular speed sensor 8 is filtered.

Before each of the acceleration data and the angular speed data is inputted into the acceleration data processing unit 42 or the angular speed data processing unit 44, the vibration noise removal unit 46 processes the acceleration data and the angular speed data. Specifically, the vibration noise removal unit 46 determines whether the acceleration data and the angular speed data include the vibration noise caused by bounce of the vehicle. When the acceleration data and the angular speed data include the vibration noise, the vibration noise removal unit 46 removes the vibration noise from the acceleration data and the angular speed data. Then, the acceleration data and the angular speed data are inputted from the vibration noise removal unit 46 into each of the acceleration data processing unit 42 and the angular speed data processing unit 44.

The vibration noise removing process executed by the CPU 32 for performing functions of the vibration noise removal unit 46 is explained with reference to FIG. 3. The vibration noise removal process is performed by a computer program, i.e., the vibration noise removal process is performed by a computer program product in a computer readable medium.

The vibration noise removing process is executed repeatedly by the CPU 32 when the vehicle runs. When the CPU 32 starts to execute the process, firstly, the CPU 32 determines in Step S110 whether a sampling time has passed after a previous vibration noise removal process is finished. Specifically, the CPU 32 waits for the sampling time to advance. The sampling time, for example, 100 ms, is preliminarily determined.

After the sampling time has passed, it goes to Step S120. In Step S120, the detection signal from the acceleration sensor 6 is converted with A/D conversion, and then, the converted signal as an acceleration data is inputted and memorized in a memory, i.e., the RAM 36. Then, it goes to Step S130. In Step S130, the detection signal from the angular speed sensor 8 is converted with A/D conversion, and then, the converted signal as an angular speed data is inputted and memorized in the memory, i.e., the RAM 36.

Thus, in Steps S110 to S130, the detection signals from the acceleration sensor 6 and the angular speed sensor 8 are sampled in each sampling time, and then, each data is memorized in the RAM 36 in the above order, respectively.

Then, it goes to Step S140. In Step S140, N acceleration sampling data, which are obtained in the past N times sampling processes, are read out from the RAM 36. Here, N represents a natural number such as 1, 2, 3 and so on. Next, in Step S150, a difference Da between the maximum acceleration data and the minimum acceleration data are calculated on the basis of the N acceleration sampling data.

In Step S160, the CPU 32 determines whether the difference Da is larger than a predetermined threshold Ta. When the difference Da is larger than the threshold Ta, it goes to Step S170. When the difference Da is equal to or smaller than the threshold Ta, it goes to Step S220.

Next, in Step S170, N angular speed sampling data, which are obtained in the past N times sampling processes, are read out from the RAM 36. Next, in Step S180, a difference Db between the maximum angular speed data and the minimum angular speed data are calculated on the basis of the N angular speed sampling data.

In Step S190, the CPU 32 determines whether the difference Db is larger than a predetermined threshold Tb. When the difference Db is larger than the threshold Tb, it goes to Step S200. In this case, both differences Da, Db are larger than the thresholds Ta, Tb, respectively, so that the CPU 32 determines that the vehicle rides over a step or the like. Specifically, in this case, the CPU 32 determines that the vibration noise is superimposed on the detection signals from the acceleration sensor 6 and the angular speed sensor 8. When the difference Db is equal to or smaller than the threshold Tb, it goes to Step S220.

In Step S200, a mid-acceleration data as a center value among N acceleration sampling data, which are read out in Step S140, is calculated. The mid-acceleration data is almost a middle value. Thus, the mid-acceleration data is selected as a currently detected acceleration data. This mid-acceleration data is memorized as a current acceleration data in the RAM 36. The current acceleration data is processed in the acceleration data processing unit 42. Then, it goes to Step S210.

In Step S210, a mid-angular speed data as a center value among N angular speed sampling data, which are read out in Step S170, is calculated. The mid-angular speed data is almost a middle value. Thus, the mid-angular speed data is selected as a currently detected angular speed data. This mid-angular speed data is memorized as a current angular speed data in the RAM 36. The current angular speed data is processed in the angular speed data processing unit 44. Then, it goes to Step S110.

On the other hand, in Step S220, the acceleration data read out in Step S120 is memorized as the current acceleration data in the RAM 36. The current acceleration data is processed in the acceleration data processing unit 42. Then, it goes to Step S230.

In Step S230, the angular speed data read out in Step S130 is memorized as the current angular speed data in the RAM 36. The current angular speed data is processed in the angular speed data processing unit 44. Then, it goes to Step S110.

Figure 3:
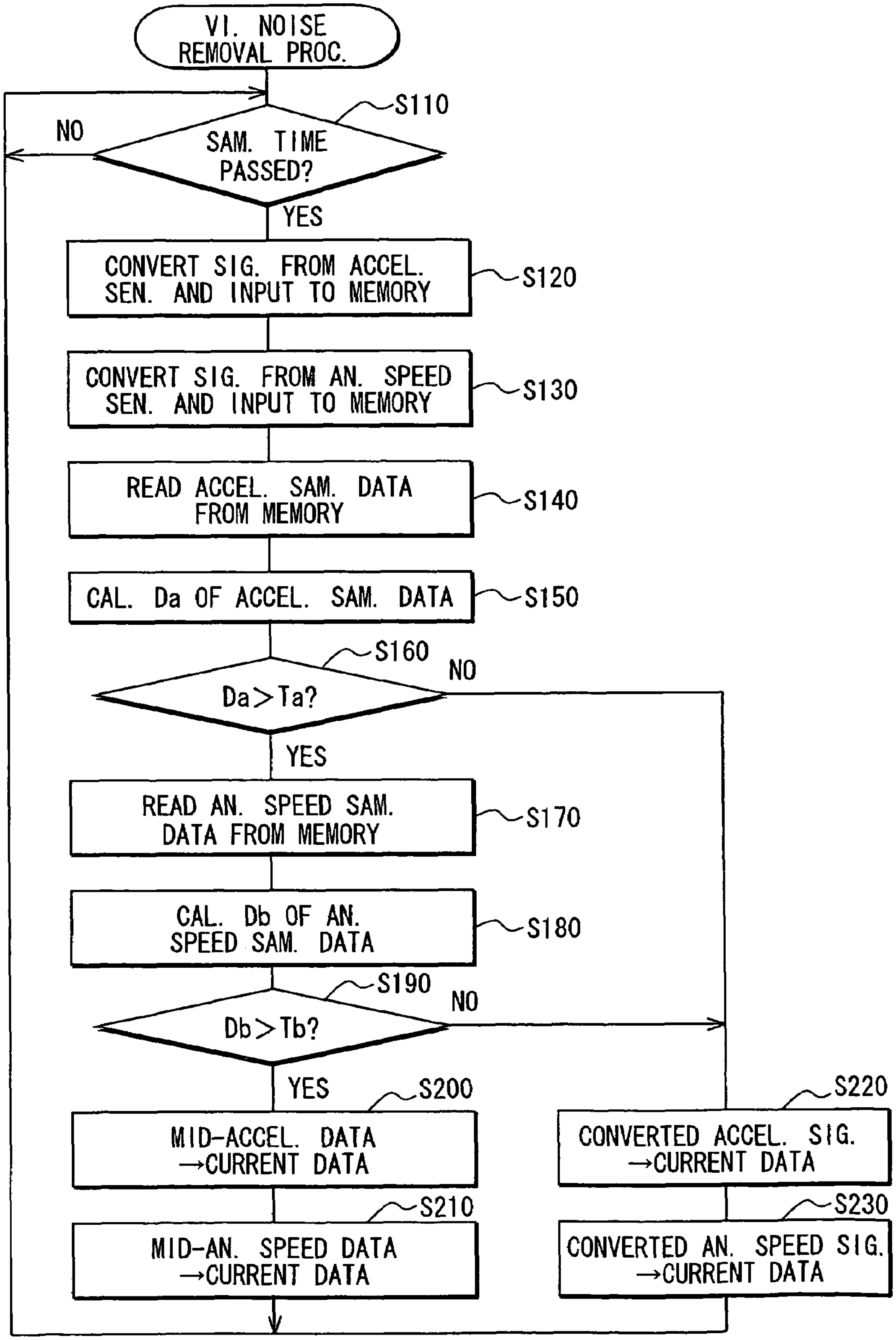
FIG. 3 is a flow chart showing a vibration noise removal process.

In the vibration noise removal process shown in FIG. 3, Steps S140 and S150 correspond to a first data determination means. Steps S170 and S180 correspond to a second data determination means. Steps S200 and S210 correspond to a vibration noise removal means.

In the navigation device 2, the detection signals from the acceleration sensor 6 and the angular speed sensor 8, which are easily affected by the up-down bounce of the vehicle, are processed in the vibration noise removal process before the detection signals are filtered for removing an ordinary noise.

Figure 4A:
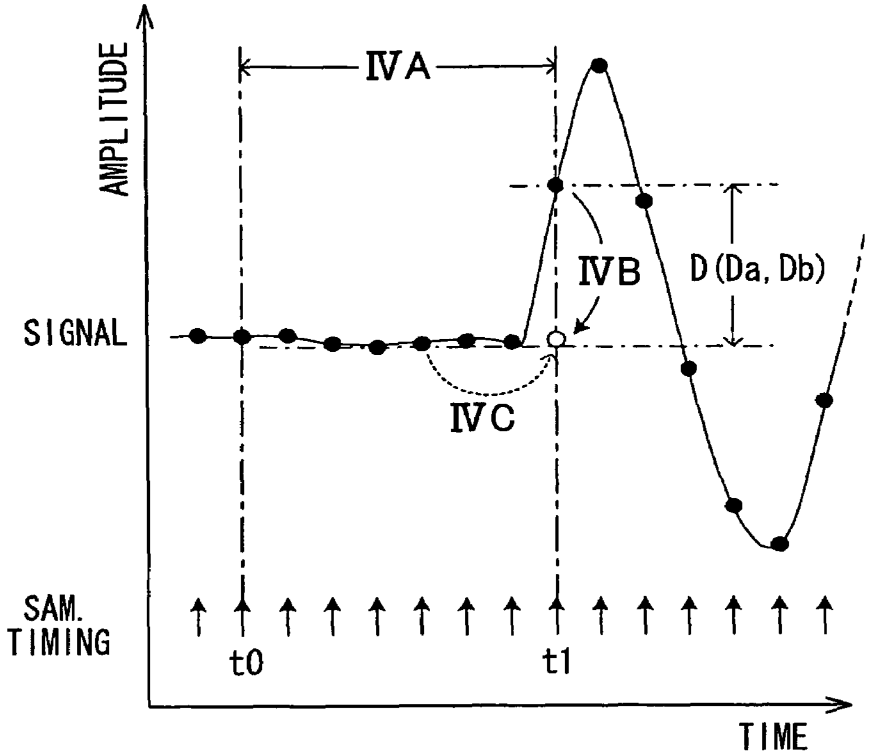
FIG. 4A is a partially enlarged graph showing a relationship between a detection signal and time.
Figure 4B:
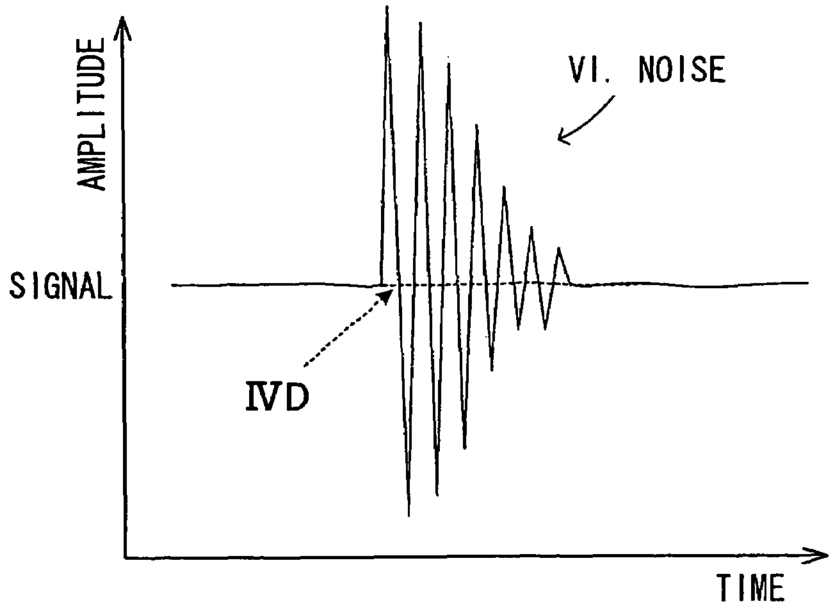
FIG. 4B is a graph showing a relationship between a detection signal and time.

As shown in FIGS. 4A and 4B, in the vibration noise removal process, firstly, the detection signals from the acceleration sensor 6 and the angular speed sensor 8 are sampled in each sampling time. Here, IVA represents a sampling period, and the sampling period IVA starts at an initial sampling time t0 and ends at an end sampling time t1. D (i.e., Da or Db) represents a difference between the maximum value and the minimum value among N sampling data in the sampling period IVA. The CPU 32 determines whether both of the differences Da, Db of the acceleration data and the angular speed data are larger than the thresholds Ta, Tb, respectively.

Specifically, the CPU 32 determines whether the detection signals from the acceleration sensor 6 and the angular speed sensor 8 are changed more largely than predetermined threshold variations corresponding to the thresholds Ta, Tb, respectively. Here, a determination frequency is defined on the basis of the sampling period IVA and the number of N (e.g., eight in FIG. 4A). When the variation of the acceleration data or the angular speed data is varied with a frequency equal to or larger than the determination frequency, the variation of the acceleration data or the angular speed data is sampled.

When both of the detection signals are changed with variation amounts larger than the predetermined threshold variations and with frequencies equal to or larger than the determination frequencies, respectively, the CPU 32 determines that the vehicle rides over a step and a vibration of the vehicle is occurred. Further, each sensor 6, 8 is affected by the vibration of the vehicle so that the vibration noise is superimposed on the detection signal of each sensor 6, 8. In this case, the mid-acceleration data (i.e., IVC) and the mid-angular speed data (i.e., IVC) are set to be the current acceleration data and the current angular speed data. Specifically, the actual current data at the end sampling time t1 is amended to the mid-data, which is shown as compensation IVB in FIG. 4A. Thus, the vibration noise is removed from each of the acceleration data and the angular speed data.

Thus, when the vibration noise is superimposed on the detection signal, for example, as shown in FIG. 4B, the vibration noise is removed from the detection signal so that the amended detection signal IVD shown as a dotted line in FIG. 4B is obtained. Then, by using the amended detection signal, calculation such as a driving trajectory, i.e., a driving trace, is performed. Accordingly, even if the vibration noise is superimposed on the detection signal, the acceleration and the angular speed of the vehicle are accurately detected, so that the driving condition of the vehicle is accurately detected. Thus, the accurate driving trajectory is obtained, and the driving guide for the driver is accurately performed.

Here, although the number of the sampling time is eight in FIG. 4A, i.e., N is eight, N may be other number. Here, the number N of the sampling time and the thresholds Ta, Tb for determination of the vibration noise may be determined on the basis of the vibration characteristics of the vehicle when the vehicle rides over a step and output characteristics of the detection signals from the sensors 6, 8.

In the above device 2, the detection signals are sampled at the same time from the sensors 6, 8 so that it is accurately determined that the detection signals from the sensors 6, 8 are varied in synchronization with the vertical vibration of the vehicle. Alternatively, the sampling time of the detection signal from the acceleration sensor 6 may be different from that of the angular speed sensor 8, and further, the sampling period of the detection signal from the acceleration sensor 6 may be different from that of the angular speed sensor 8. Even when the detection signals from the sensors 6, 8 are sampling with different sampling time and different sampling period, the CPU 32 can determines whether the vibration noise caused by the up-down vibration of the vehicle is superimposed on the signals as long as the detection signals from the sensors 6, 8 are varied almost at the same time.

When the CPU 32 determines that the vibration noise is superimposed on the signals, the mid-data, i.e., the center data among N sampling data in each detection signal is set to be the current detection data. Thus, the vibration noise is removed from the detection signal. Alternatively, an average value may be obtained from N sampling data in each detection signal, and then, the average value is set to be a current data so that the vibration noise is removed from the detection signal.

Figure 5:
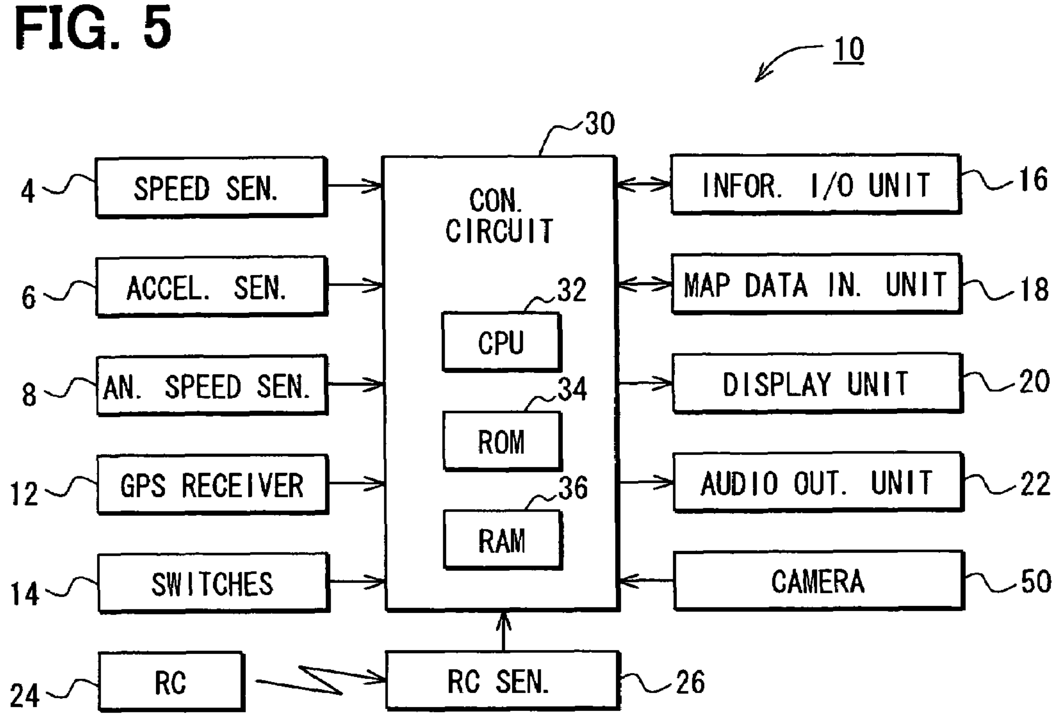
FIG. 5 is a block diagram showing another navigation device.
Figure 6:
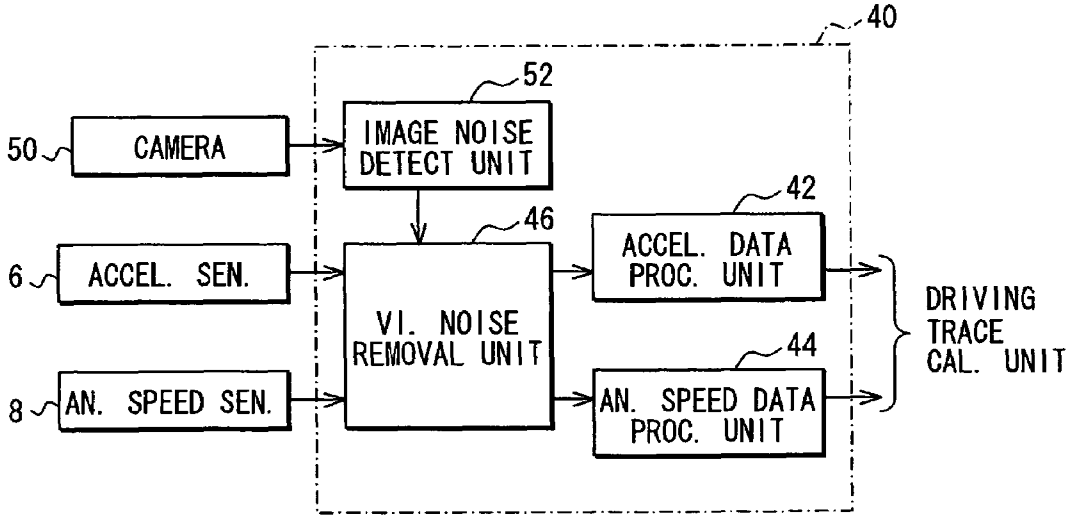
FIG. 6 is a block diagram showing a sensor signal processing unit 40 in the another navigation device.

Next, another navigation device 10 is explained. The device 10 is shown in FIG. 5. The device 10 includes a camera 50 as an imaging device for taking an image of a road in front of the vehicle.

A cruise control system in the vehicle recognizes a traffic line such as a white line on a road, on which the vehicle runs, on the basis of the image obtained from the camera 50. Further, the cruise control system alerts the driver not to deviate a traffic lane and not to stray over the traffic line so that the cruise control system assists the driver to drive the vehicle safety.

The sensor signal processing unit 40 in the device 10 includes an image noise detection unit 52, i.e., an image vibration detection unit. Specifically, the sensor signal process unit 40 retrieves the image from the camera 50, and then, the image noise detection unit 52 determines on the basis of the image of the camera 50 whether the vehicle bounces in the vertical direction. When the image noise detection unit 52 determines that the vehicle bounces in the vertical direction, the vibration noise removal unit 46 amends the acceleration data and the angular speed data, i.e., removes the vibration noise from the acceleration data and the angular speed data.

Thus, the image noise detection unit 52 performs a vibration detection process on the basis of the image (i.e., an image noise detection process or an image vibration detection process) so that the CPU 32 determines whether the vehicle bounces up and down on the basis of the image of the camera 50. This determination is performed independently from a vibration noise removal process by the vibration noise removal unit 46. In accordance with the result of the image noise detection process, the CPU 32 determines whether the vibration noise removal process after Step S140 is performed or not.

The image noise detection process is explained with reference to FIG. 7. Here, the image noise detection process, i.e., the image noise detection unit 52, corresponds to an image vibration detection means.

Figure 7:
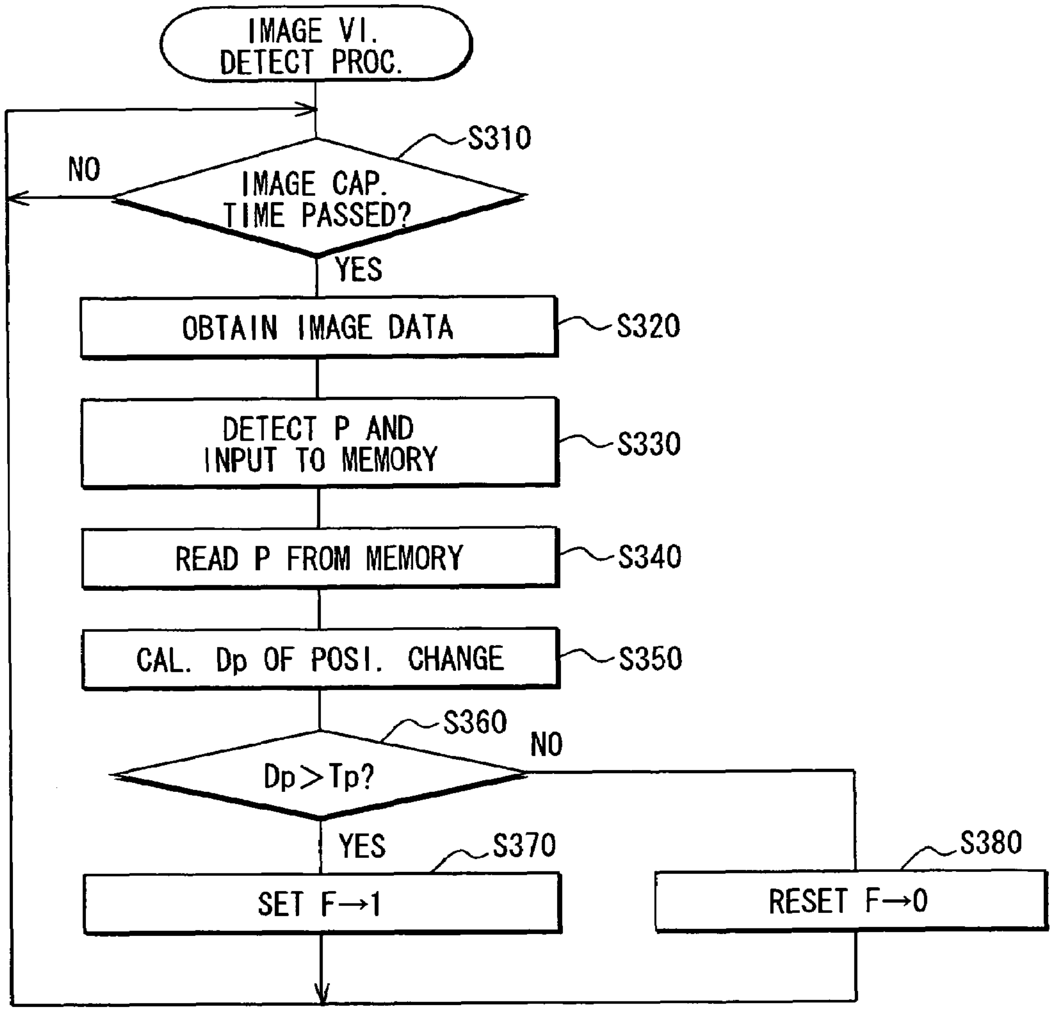
FIG. 7 is a flow chart showing an image vibration detection process.

As shown in FIG. 7, firstly, in Step S310, the CPU 32 determines whether an image capture time, i.e., an imaging time such as a 1/30 seconds in a conventional camera having a NTSC method, has passed. The image capture time corresponds to a time, in which the camera 50 takes one image. Thus, the CPU 32 waits for the imaging time to pass. After the imaging time has passed, it goes to Step S320. In Step S320, the current image of a front view of the vehicle inputted from the camera 50 is retrieved.

Then in Step S330, the image retrieved in Step S320 is analyzed so that a position P of a horizontal line in the image (specifically, a positional coordinate in the vertical direction of the image) is detected. The horizontal line position P is memorized in the RAM 36.

Next, in Step S340, M detection data corresponding to the horizontal line position data inputted in the RAM 36, which are obtained in the past M image capture times, are read out from the RAM 36. Here, M represents a natural number such as 1, 2, 3 and so on. Next, in Step S350, a difference Dp between the maximum horizontal line position data and the minimum horizontal line position data is calculated on the basis of the M horizontal line position data. The difference Dp shows a positional change amount of the horizontal line.

In Step S360, the CPU 32 determines whether the difference Dp is larger than a predetermined threshold Tp, which is preliminarily set to be a threshold for vibration detection. When the difference Dp is larger than the threshold Tp, it goes to Step S370. In Step S370, a flag F for detection of vehicle vibration is set to be one (i.e., F=1). When the difference Dp is equal to or smaller than the threshold Tp, it goes to Step S380. In Step S380, the flag F for detection of vehicle vibration is set to be zero (i.e., F=0). Thus, after the flag F is set or reset, it goes to Step S310.

Thus, in the image noise detection process shown in FIG. 7, M images obtained from the camera 50 periodically are used so that the positional change Dp of the horizontal line on the images is calculated. Then, the CPU 32 determines whether the positional change Dp is larger than the threshold Tp. Here, a determination frequency is defined on the basis of the sampling period of the camera 50 and the number of M for vibration detection. When the variation of the images is varied with a frequency equal to or larger than the determination frequency, the variation of the images is captured.

When the images are changed with a variation amount (i.e., a variation amplitude) larger than the predetermined threshold Tp and with a frequency equal to or larger than the determination frequency, respectively, the CPU 32 determines that the vehicle vibrates up and down. When the CPU 32 determines that the vehicle vibrates up and down, the flag F for detection of vehicle vibration is set to be one, i.e., the flag F is set. When the CPU 32 determines that the vehicle does not vibrate up and down, the flag F for detection of vehicle vibration is set to be zero, i.e., the flag F is reset.

Figure 8:
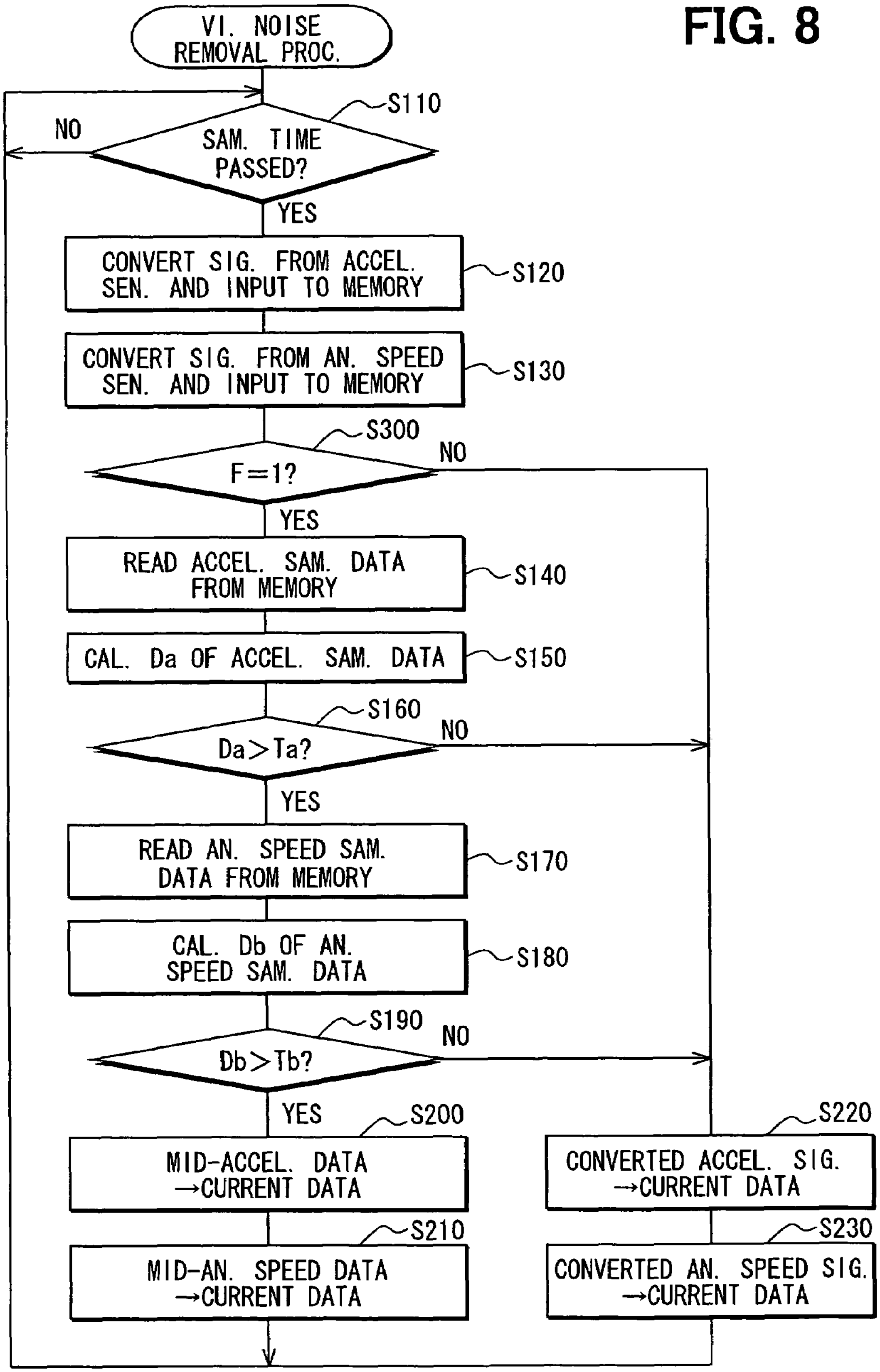
FIG. 8 is a flow chart showing a vibration noise removal process.

As shown in FIG. 8, the flag F is used for determining whether the vertical vibration of the vehicle is detected by using the images of the camera 50 in Step S300 after Step S130 of the vibration noise removal process.

In the vibration noise removal process, when it is determined in Step S300 that the flag F is set (i.e., F=1), it goes to Step S140. When it is determined in Step S300 that the flag F is reset (i.e., F=0), it goes to Step S220.

Thus, in the device 10, the CPU 32 much accurately detects that the vibration noise caused by the vertical vibration of the vehicle is superimposed on the detection signals from the acceleration sensor 6 and the angular speed sensor 8. Accordingly, if the vehicle does not vibrate in the vertical direction, the acceleration data and the angular speed data are prevented from being amended by mistake.

In the device 10, the change amount of the images of the horizontal line in the vertical direction is defined on the basis of the images so that the vibration determination is performed. Alternatively, the vibration determination may be defined as a change of an angle for vertical vibration detection. The angle is obtained by converting the images of the camera 50.

Although, in each navigation device 2, 10 having the acceleration sensor 6 and the angular speed sensor 8, the vibration noise is removed from each detection signal from the sensors 6, 8, in another in-vehicle device for detecting driving condition of the vehicle, the vibration noise may be removed from a detection signal.

Further, in each navigation device 2, 10, the vibration noise is removed from the detection signal of the acceleration sensor 6 or the angular speed sensor 8. Alternatively, the in-vehicle device may include multiple acceleration sensors so that the vibration noise is removed from each detection signal from multiple acceleration sensors. Alternatively, the in-vehicle device may include multiple angular speed sensors so that the vibration noise is removed from each detection signal from multiple angular speed sensors. Alternatively, the in-vehicle device may include multiple angular speed sensors and multiple acceleration sensors so that the vibration noise is removed from each detection signal from multiple angular speed sensors and multiple acceleration sensors.

Figure 9A:
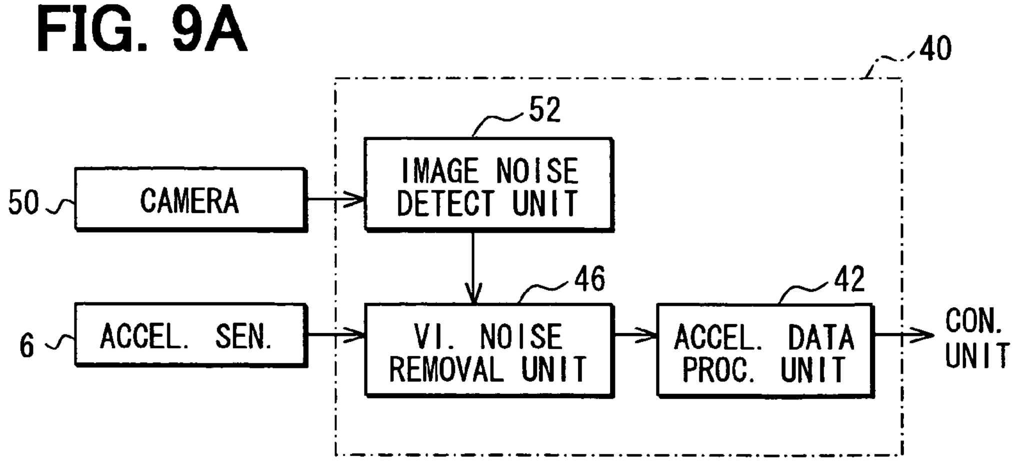
FIG. 9A is a block diagram showing a sensor signal processing unit in a third navigation device.

Furthermore, alternatively, the device may include the camera 50 and the acceleration sensor 6, as shown in FIG. 9A. In this case, for example, the detection signal from the acceleration sensor 6 is converted with A/D conversion method. Then, the converted detection signal as the acceleration data is outputted to various control devices. In this acceleration detection device shown in FIG. 9A, the vibration noise removal unit 46 removes the vibration noise on the basis of detection of the vibration noise detected by change of the detection signal from the acceleration sensor 6. The image noise detection unit 52 detects the vertical vibration of the vehicle on the basis of the images from the camera 50. Only when it is determined that the vertical vibration of the vehicle is detected, the vibration noise is removed from the detection signal of the acceleration sensor 6 by the vibration noise removal unit 46.

Figure 9B:
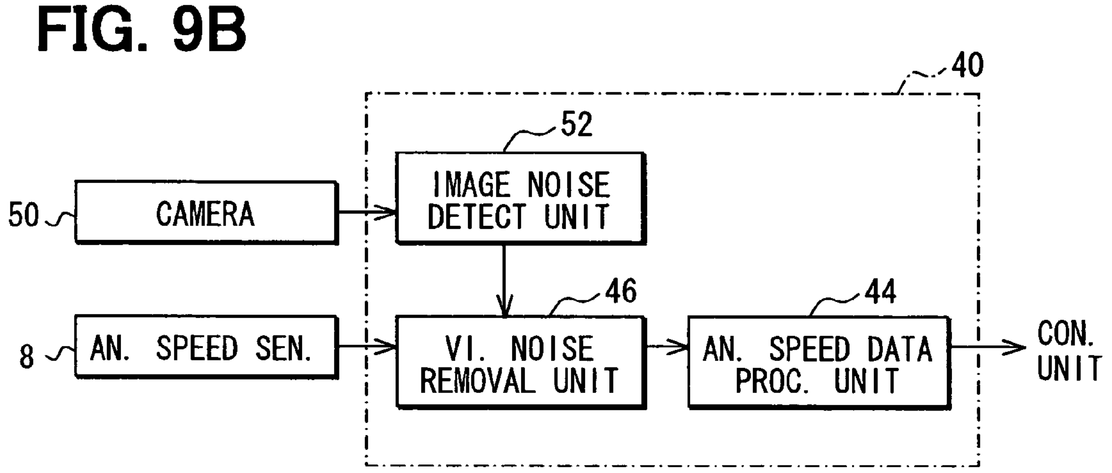
FIG. 9B is a block diagram showing a sensor signal processing unit in a fourth navigation device.

Alternatively, the device may include the camera 50 and the angular speed sensor 8, as shown in FIG. 9B. In this case, for example, the detection signal from the angular speed sensor 8 is converted with A/D conversion method. Then, the converted detection signal as the angular speed data is outputted to various control devices. In this angular speed detection device shown in FIG. 9B, the vibration noise removal unit 46 removes the vibration noise on the basis of detection of the vibration noise detected by change of the detection signal from the angular speed sensor 8. The image noise detection unit 52 detects the vertical vibration of the vehicle on the basis of the images from the camera 50. Only when it is determined that the vertical vibration of the vehicle is detected, the vibration noise is removed from the detection signal of the angular speed sensor 8 by the vibration noise removal unit 46.

In the sensor signal processing unit 40 shown in FIG. 9A or 9B, the vibration noise removal unit 46 performs the vibration noise removal process other than a process on the basis of the detection signal from the angular speed sensor 8 or the acceleration sensor 6.

Specifically, the vibration noise removal unit 46 shown in FIG. 9A performs steps of the vibration noise removal process in FIG. 8 other than Steps S130, S170-190, S210 and S230. The vibration noise removal unit 46 shown in FIG. 9B performs steps of the vibration noise removal process in FIG. 8 other than Steps S120, S140-160, S200 and S220.

The present disclosure has the following aspects.

According to a first aspect of the present disclosure, an in-vehicle device for detecting a driving condition of an automotive vehicle includes: a first sensor for detecting one of acceleration of the vehicle and angular speed of the vehicle, wherein the angular speed is defined around a predetermined axis of the vehicle; a second sensor for detecting one of the acceleration of the vehicle and the angular speed of the vehicle; a first determination unit for determining whether a first detection signal from the first sensor is varied with a first frequency equal to or larger than a predetermined first determination frequency and with a first variation amount larger than a predetermined first variation threshold; a second determination unit for determining whether a second detection signal from the second sensor is varied with a second frequency equal to or larger than a predetermined second determination frequency and with a second variation amount larger than a predetermined second variation threshold; and a vibration noise removal unit for determining that a vibration noise caused by vertical vibration of the vehicle is superimposed on each detection signal of the first and second sensors when both of the first and second determination units determine that each detection signal is varied with the frequency equal to or larger than the determination frequency and with the variation amount larger than the variation threshold. The vibration noise removal unit removes the vibration noise from each detection signal when the vibration noise removal unit determines that the vibration noise is superimposed on each detection signal, and the vibration noise is defined by the determination frequency and the variation threshold.

In the above device, when both detection signals from two sensors, which are affected by up/down vibration of the vehicle, are varied at the same time, i.e., synchronously, the vibration noise is removed from each detection signal. Thus, only when the vehicle rides over a step or the like so that the vehicle vibrates in the vertical direction, the vibration noise is removed from each detection signal. Accordingly, detection accuracies of the acceleration and the angular speed of the vehicle are improved.

In the device, the first and the second sensors are an acceleration sensor for detecting acceleration in a front/back direction of the vehicle and/or an angular speed sensor for detecting angular speed around the predetermined axis. Alternatively, the sensor, which is affected by the vertical vibration of the vehicle, may be a sensor for detecting acceleration in a right/left direction of the vehicle or a sensor for detecting angular speed around an axis perpendicular to the front/back direction or the right/left direction of the vehicle. Here, the sensor detecting angular speed around an axis perpendicular to the front/back direction or the right/left direction of the vehicle is, for example, a rolling sensor, a pitching sensor or a yawing sensor.

Alternatively, the device may include equal to or more than three sensors. In this case, when the vibration noise removal unit determines on the basis of determinations of the first and the second determination units that the vehicle vibrates in the vertical direction first and the second, the vibration noise is removed from detection signals from a third sensor and/or other sensors.

Alternatively, the device may include equal to or more than three sensors and corresponding detection units. The vibration noise removal unit determines that the vehicle vibrates in the vertical direction first and the second, when all detection units determine that each detection signal from the sensor varies with a frequency equal to or larger than a predetermined determination frequency and with a variation amount larger than a predetermined variation threshold. Only in this case, the vibration noise removal unit removes the noise from each detection signal.

Each determination unit may include a band pass filter, a detection circuit and a comparator. The band pass filter selectively passes a signal component corresponding to a vehicle vibration frequency from the detection signal. The detection circuit detects amplitude of the signal component, which is filtered by the band pass filter. The comparator determines whether a detection voltage obtained by the detection circuit is larger than a vibration determination level. In this case, the determination unit is provided by an analog circuit. Alternatively, the determination unit may be provided by a digital circuit. In this case, the digital circuit is not substantially affected by external noise or environmental conditions such as temperature change.

Alternatively, each of the first and second determination units may sample multiple sampling data from each detection signal in a predetermined sampling period corresponding to the determination frequency. Each of the first and second determination units may calculate a difference between a maximum sampling data and a minimum sampling data in multiple sampling data. Each of the first and second determination units may determine that the vibration noise is superimposed on each detection signal when the difference is larger than the variation threshold. In this case, the determination unit is provided by a digital circuit for performing a periodic sampling process. Thus, determination by the determination unit is performed without being affected by an external noise or environmental conditions.

The determination frequency may be set in accordance with vibration characteristics of the vehicle. In this case, it is accurately determines that the detection signal is varied together with the vertical vibration of the vehicle.

Alternatively, the vibration noise removal unit may calculate first and second center data in multiple sampling data, and the vibration noise removal unit removes the vibration noise in such a manner that the first and second center data are set to be current first and second detection data from the first and second sensors. In this case, the determination unit and the vibration noise removal unit are provided by digital circuits.

Alternatively, the device may further include: an image capture unit for capturing an image around the vehicle; and a vehicle vibration determination unit for determining whether the vehicle vibrates with a vehicle vibration frequency and with a vehicle vibration amount on the basis of a change of the image from the image capture unit, wherein vibration of the vehicle with the vehicle vibration frequency and the vehicle vibration amount affects each detection signal from the first and second sensors. The vibration noise removal unit removes the vibration noise from each detection signal when the vehicle vibration determination unit determines that the vibration of the vehicle affects each detection signal from the first and second sensors and when the vibration noise removal unit determines that the vibration noise is superimposed on each detection signal. In this case, the vibration noise removal unit can detect much accurately that the vibration noise is superimposed on the detection signal. Thus, if the vehicle does not vibrate in the vertical direction, the vibration noise removal unit does not determine by mistake that the vibration noise is superimposed on the detection signal.

According to a second aspect of the present disclosure, an in-vehicle device for detecting a driving condition of an automotive vehicle includes: a sensor for detecting one of acceleration of the vehicle and angular speed of the vehicle, wherein the angular speed is defined around a predetermined axis of the vehicle; an image capture unit for capturing an image around the vehicle; a determination unit for determining whether a detection signal from the sensor is varied with a frequency equal to or larger than a predetermined determination frequency and with a variation amount larger than a predetermined variation threshold; a vehicle vibration determination unit for determining whether the vehicle vibrates with a vehicle vibration frequency and with a vehicle vibration amount on the basis of a change of the image from the image capture unit, wherein vibration of the vehicle with the vehicle vibration frequency and the vehicle vibration amount affects the detection signal from the sensor; and a vibration noise removal unit for determining that a vibration noise caused by vertical vibration of the vehicle is superimposed on the detection signal when the determination unit determines that the detection signal is varied with the frequency equal to or larger than the determination frequency and with the variation amount larger than the variation threshold and when the vehicle vibration determination unit determines that the vibration of the vehicle affects the detection signal from the sensor. The vibration noise removal unit removes the vibration noise from the detection signal when the vibration noise removal unit determines that the vibration noise is superimposed on each detection signal, and the vibration noise is defined by the determination frequency and the variation threshold.

In this case, the vibration noise removal unit can detect much accurately that the vibration noise is superimposed on the detection signal. Thus, if the vehicle does not vibrate in the vertical direction, the vibration noise removal unit does not determine by mistake that the vibration noise is superimposed on the detection signal.

According to a third aspect of the present disclosure, a computer program product in a computer readable medium for use in an in-vehicle device for detecting a driving condition of an automotive vehicle, the product includes: an instruction for detecting one of acceleration of the vehicle and angular speed of the vehicle with a first sensor, wherein the angular speed is defined around a predetermined axis of the vehicle; an instruction for detecting one of the acceleration of the vehicle and the angular speed of the vehicle with a second sensor; an instruction for determining with a first determination unit whether a first detection signal from the first sensor is varied with a first frequency equal to or larger than a predetermined first determination frequency and with a first variation amount larger than a predetermined first variation threshold; an instruction for determining with a second determination unit whether a second detection signal from the second sensor is varied with a second frequency equal to or larger than a predetermined second determination frequency and with a second variation amount larger than a predetermined second variation threshold; and an instruction for determining with a vibration noise removal unit that a vibration noise caused by vertical vibration of the vehicle is superimposed on each detection signal when both of the first and second determination units determine that each detection signal is varied with the frequency equal to or larger than the determination frequency and with the variation amount larger than the variation threshold. The vibration noise removal unit removes the vibration noise from each detection signal when the vibration noise removal unit determines that the vibration noise is superimposed on each detection signal, and the vibration noise is defined by the determination frequency and the variation threshold.

In the above product, when both detection signals from two sensors, which are affected by up/down vibration of the vehicle, are varied at the same time, i.e., synchronously, the vibration noise is removed from each detection signal. Thus, only when the vehicle rides over a step or the like so that the vehicle vibrates in the vertical direction, the vibration noise is removed from each detection signal. Accordingly, detection accuracies of the acceleration and the angular speed of the vehicle are improved.

According to a third aspect of the present disclosure, a computer program product in a computer readable medium for use in an in-vehicle device for detecting a driving condition of an automotive vehicle, the product includes: an instruction for detecting one of acceleration of the vehicle and angular speed of the vehicle with a sensor, wherein the angular speed is defined around a predetermined axis of the vehicle; an instruction for capturing an image around the vehicle with an image capture unit; an instruction for determining with a determination unit whether a detection signal from the sensor is varied with a frequency equal to or larger than a predetermined determination frequency and with a variation amount larger than a predetermined variation threshold; an instruction for determining with a vehicle vibration determination unit whether the vehicle vibrates with a vehicle vibration frequency and with a vehicle vibration amount on the basis of a change of the image from the image capture unit, wherein vibration of the vehicle with the vehicle vibration frequency and the vehicle vibration amount affects the detection signal from the sensor; and an instruction for determining with a vibration noise removal unit that a vibration noise caused by vertical vibration of the vehicle is superimposed on the detection signal when the determination unit determines that the detection signal is varied with the frequency equal to or larger than the determination frequency and with the variation amount larger than the variation threshold and when the vehicle vibration determination unit determines that the vibration of the vehicle affects the detection signal from the sensor. The vibration noise removal unit removes the vibration noise from the detection signal when the vibration noise removal unit determines that the vibration noise is superimposed on each detection signal, and the vibration noise is defined by the determination frequency and the variation threshold.

In this case, the vibration noise removal unit can detect much accurately that the vibration noise is superimposed on the detection signal. Thus, if the vehicle does not vibrate in the vertical direction, the vibration noise removal unit does not determine by mistake that the vibration noise is superimposed on the detection signal.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An in-vehicle device for detecting a driving condition of an automotive vehicle, the in-vehicle device being part of a navigation device, comprising:

a first sensor for detecting one of acceleration of the vehicle and angular speed of the vehicle, wherein the angular speed is defined around a predetermined axis of the vehicle;

a second sensor for detecting one of the acceleration of the vehicle and the angular speed of the vehicle;

a first determination unit for determining whether a first detection signal from the first sensor is varied with a first frequency equal to or larger than a predetermined first determination frequency and with a first variation amount larger than a predetermined first variation threshold;

a second determination unit for determining whether a second detection signal from the second sensor is varied with a second frequency equal to or larger than a predetermined second determination frequency and with a second variation amount larger than a predetermined second variation threshold; and a vibration noise removal unit for determining that a vibration noise caused by vertical vibration of the vehicle is superimposed on each detection signal of the first and second sensors when both of the first and second determination units determine that each detection signal is varied with the frequency equal to or larger than the determination frequency and with the variation amount larger than the variation threshold, wherein the vibration noise removal unit removes the vibration noise from each detection signal when the vibration noise removal unit determines that the vibration noise is superimposed on each detection signal, and the vibration noise is defined by the determination frequency and the variation threshold, wherein the in-vehicle device is a part of a navigation device.

2. The device according to claim 1, wherein each of the first and second determination units samples multiple sampling data from each detection signal in a predetermined sampling period corresponding to the determination frequency, each of the first and second determination units calculates a difference between a maximum sampling data and a minimum sampling data in multiple sampling data, and each of the first and second determination units determines that the vibration noise is superimposed on each detection signal when the difference is larger than the variation threshold.

3. The device according to claim 2, wherein the vibration noise removal unit calculates first and second center data in multiple sampling data, and the vibration noise removal unit removes the vibration noise in such a manner that the first and second center data are set to be current first and second detection data from the first and second sensors.

4. The device according to claim 1, further comprising:

an image capture unit for capturing an image around the vehicle; and a vehicle vibration determination unit for determining whether the vehicle vibrates with a vehicle vibration frequency and with a vehicle vibration amount on the basis of a change of the image from the image capture unit, wherein vibration of the vehicle with the vehicle vibration frequency and the vehicle vibration amount affects each detection signal from the first and second sensors, wherein the vibration noise removal unit removes the vibration noise from each detection signal when the vehicle vibration determination unit determines that the vibration of the vehicle affects each detection signal from the first and second sensors and when the vibration noise removal unit determines that the vibration noise is superimposed on each detection signal.

5. The device according to claim 4, wherein each of the first and second determination units samples multiple sampling data from each detection signal in a predetermined sampling period corresponding to the determination frequency, each of the first and second determination units calculates a difference between a maximum sampling data and a minimum sampling data in multiple sampling data, each of the first and second determination units determines that the vibration noise is superimposed on each detection signal when the difference is larger than the variation threshold, the first determination frequency is substantially equal to the second determination frequency, and the first determination frequency is substantially equal to the vehicle vibration frequency.

6. The device according to claim 5, wherein the vibration noise removal unit calculates first and second center data in multiple sampling data, and the vibration noise removal unit removes the vibration noise in such a manner that the first and second center data are set to be current first and second detection data from the first and second sensors.

7. A computer program product in a computer readable medium for use in an in-vehicle device, which is part of a navigation device, for detecting a driving condition of an automotive vehicle, the product comprising:

an instruction for detecting one of acceleration of the vehicle and angular speed of the vehicle with a first sensor, wherein the angular speed is defined around a predetermined axis of the vehicle;

an instruction for detecting one of the acceleration of the vehicle and the angular speed of the vehicle with a second sensor;

an instruction for determining with a first determination unit whether a first detection signal from the first sensor is varied with a first frequency equal to or larger than a predetermined first determination frequency and with a first variation amount larger than a predetermined first variation threshold;

an instruction for determining with a second determination unit whether a second detection signal from the second sensor is varied with a second frequency equal to or larger than a predetermined second determination frequency and with a second variation amount larger than a predetermined second variation threshold; and an instruction for determining with a vibration noise removal unit that a vibration noise caused by vertical vibration of the vehicle is superimposed on each detection signal when both of the first and second determination units determine that each detection signal is varied with the frequency equal to or larger than the determination frequency and with the variation amount larger than the variation threshold, wherein the vibration noise removal unit removes the vibration noise from each detection signal when the vibration noise removal unit determines that the vibration noise is superimposed on each detection signal, and the vibration noise is defined by the determination frequency and the variation threshold, wherein the in-vehicle device is a part of a navigation device.

8. The device according to claim 1, the vibration noise removal unit being configured to perform:

(i) the determining whether the vibration noise is superimposed on each detection signal, and (ii) the removing of the vibration noise, while the vehicle is being driven and the first sensor and second sensor are performing the detecting of one of the acceleration of the vehicle and the angular speed of the vehicle.

9. The computer program product according to claim 7, the vibration noise removal unit being configured to perform:

(i) the determining whether the vibration noise is superimposed on each detection signal, and (ii) the removing of the vibration noise, while the vehicle is being driven and the first sensor and second sensor are performing the detecting of one of the acceleration of the vehicle and the angular speed of the vehicle.

10. An in-vehicle device for detecting a driving condition of an automotive vehicle, the in-vehicle device being part of a navigation device, comprising:

a first sensor configured to detect one of acceleration of the vehicle and angular speed of the vehicle, wherein the angular speed is defined around a predetermined axis of the vehicle;

a second sensor configured to detect one of the acceleration of the vehicle and the angular speed of the vehicle;

a first determination unit configured to determine whether a first detection signal from the first sensor is varied with a first frequency equal to or larger than a predetermined first determination frequency and with a first variation amount larger than a predetermined first variation threshold;

a second determination unit configured to determine whether a second detection signal from the second sensor is varied with a second frequency equal to or larger than a predetermined second determination frequency and with a second variation amount larger than a predetermined second variation threshold; and a vibration noise removal unit configured to determine that a vibration noise caused by vertical vibration of the vehicle is being superimposed on each detection signal of the first and second sensors when both of the first and second determination units determine that each detection signal is varied with the frequency equal to or larger than the determination frequency and with the variation amount larger than the variation threshold, otherwise determining that the vibration noise caused by the vertical vibration is not being superimposed, the vibration noise removal unit removing the determined vibration noise from each detection signal when the vibration noise removal unit determines that the vibration noise is being superimposed on each detection signal, and not removing the vibration noise when the vibration noise removal unit determines that vibration noise is not being superimposed, the vibration noise being defined by the determination frequency and the variation threshold, the in-vehicle device being a part of a navigation device.

* * * * *